United States Patent [19]
Futch

[11] Patent Number: 6,082,300
[45] Date of Patent: Jul. 4, 2000

[54] GAME FEEDER

[76] Inventor: John D. Futch, Box 2922, Arcadia, La. 71001

[21] Appl. No.: 09/080,677

[22] Filed: May 18, 1998

Related U.S. Application Data

[60] Provisional application No. 60/047,138, May 20, 1997.

[51] Int. Cl.[7] .................................................. A01K 5/02
[52] U.S. Cl. ...................................... 119/51.11; 119/52.1
[58] Field of Search ........................... 119/51.11, 51.01, 119/52.1, 51.13, 51.14, 51.15, 51.04, 57.91, 57.92; 222/650

[56] References Cited

U.S. PATENT DOCUMENTS

| | | | |
|---|---|---|---|
| 3,033,164 | 5/1962 | Evers . | |
| 3,867,904 | 2/1975 | Akkerman | 119/57.91 |
| 3,949,909 | 4/1976 | Sterner | 119/579.91 X |
| 4,129,264 | 12/1978 | Lanin et al. | 241/285 |
| 4,565,159 | 1/1986 | Sweeney | 119/53 |
| 4,899,915 | 2/1990 | Toupel | 222/459 |
| 4,986,220 | 1/1991 | Reneau et al. | 119/57.91 |
| 5,143,289 | 9/1992 | Gresham et al. | 119/57.91 X |
| 5,333,572 | 8/1994 | Nutt | 119/57.91 |

*Primary Examiner*—Peter M. Poon
*Assistant Examiner*—Yvonne R. Abbott
*Attorney, Agent, or Firm*—John M. Harrison

[57] ABSTRACT

A game feeder for suspending from a tree limb or other support and automatically feeding corn or other particulate feed from a hopper to the ground silently and at timed intervals to simulate the falling of nuts such as acorns from the tree. In a preferred embodiment a feed bowl is hingedly attached to the bottom of the hopper and contains a feeding mechanism suspended from the bottom of the hopper and characterized by a rotating wheel driven by a timing mechanism and mounted in a feeder housing. Particulate food such as corn is dispensed from the hopper through an opening in the hopper feed bowl by operation of the wheel and sound-insulating material is provided in the feeder housing and the hopper feed bowl for noise abatement. The timing mechanism thus dispenses the feed from the hopper to the ground at selected operational intervals with a minimum of noise.

20 Claims, 3 Drawing Sheets

GAME FEEDER

CROSS-REFERENCE TO RELATED APPLICATIONS

This application claims the benefit of U.S. Provisional Application Ser. No. 60/047,138, filed May 20, 1997.

BACKGROUND OF THE INVENTION

1. Field of the Invention

This invention relates to devices for feeding animals, including wild game, such as deer, elk, squirrels, rabbits and like animals and more particularly, to a quiet automatic feeding device which simulates the falling of nuts such as acorns from trees in a random manner. The game feeder is capable of operating reliably and automatically according to a selected time sequence to disperse pelletized particulate or granulated food or grain such as corn beneath the tree or other support for a selected period of time. In a preferred embodiment the game feeder of this invention is characterized by a cylindrical metal housing or hopper for containing particulate feed such as corn and is adapted for suspending from a tree limb or other support with a sound-insulated dispensing system and a timer mechanism for automatically quietly dispensing feed from an elevated position to the ground at selected intervals. In a most preferred embodiment a hopper feed bowl is provided on the bottom of the feed hopper and the feeding mechanism is characterized by a feeder housing fitted with a rotating feeder wheel driven by battery-operated motor and gearbox, wherein the feeder housing and the hopper feed bowl are provided with sound-deadening insulation to facilitate dispensing of corn or other particulate food from the hopper through the feeder housing by operation of the feeder wheel and from an opening in the hopper feed bowl, to the ground.

2. Description of the Prior Art

The feeding of various types of animals including fish in remote or generally inaccessible areas has received considerable attention in recent years, both for the purpose of hunting, fishing and game management. Various types of automatic feeding device are known, most of which include a hopper for storing pelletized or particulate food or grain such as corn and various types of mechanisms for dispensing the food from the hopper at controlled intervals. Many of these devices are fitted with an on-demand feeding system which is activated by the animals or fish themselves and dispense the feed upon contacting a bar or lever which is suspended from the hopper. Other mechanisms are fitted with automatic dispensers which allow the feed to flow from the hopper at predetermined time intervals, including broadcast-type feeding mechanisms which utilize a spinning wheel to receive particulate food or grain from the hopper and broadcast the food or grain over a wide area beneath the feeding device.

It is an object of this invention to provide a new and improved bottom-access automatic game feeder which is self-contained, automatic and capable of quietly feeding animals according to predetermined time sequences.

Another object of the invention is to provide a new and improved game feeder which may be located in remote and inaccessible areas and serves to automatically, quietly and reliably feed animals, including wild game, according to predetermined time sequences and for predetermined feed-dispensing intervals.

Still another object of the invention is to provide a self-contained automatic game feeder which may be suspended from a tree limb or other support above an animal feeding area and includes sound-deadening insulation to facilitate dispensing of particulate feed quietly according to timed sequences to the feeding area.

Yet another object of this invention is to provide a new and improved game feeder which is characterized by a hopper or container for containing particulate food such as corn and a feeding mechanism attached to the bottom of the hopper and contained within a hopper feed bowl having an opening in the bottom thereof. The feed mechanism includes a battery-operated motor and gearbox electrically connected to a timing mechanism and a sound-insulated feeder wheel for dispensing particulate feed or grain from the hopper to a sound-insulated hopper feed bowl quietly and in a selected time sequence that simulates the falling of acorns and other nuts from trees to minimize the noise of operation and alarm to the animals in the feeding area.

SUMMARY OF THE INVENTION

These and other objects of the invention are provided in a new and improved game feeder adapted for suspension in a tree and including a cylindrical hopper for containing a particulate feed such as corn, a feeding mechanism characterized by a battery-operated, rotating wheel electrically connected to a timing mechanism. The wheel is mounted in a feeder housing fitted with sound-insulating material and a sound-deadened hopper feed bowl is provided on the bottom of the hopper and encloses the feeding mechanism, wherein feed is dispensed quietly according to a preset time sequence from the hopper through the feeder housing by operation of the wheel and from the feeder housing through an opening in the hopper feed bowl, into a feeding area. The sound-deadening or insulating material is provided in the feeder housing and in the hopper feed bowl to minimize noise as the game feeder operates, such that the falling of the grain or other particulate food from the game feeder simulates the falling of acorns or other nuts from the tree.

BRIEF DESCRIPTION OF THE DRAWINGS

The invention will be better understood by reference to the accompanying drawings, wherein.

DESCRIPTION OF THE PREFERRED EMBODIMENTS

Figure 1:
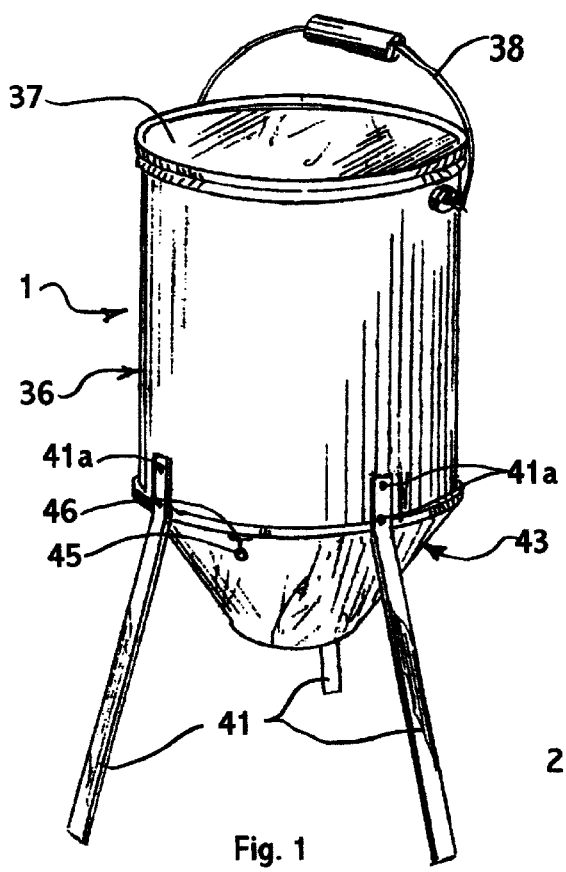
FIG. 1 is a perspective view of the preferred embodiment of the game feeder this invention.
Figure 2:
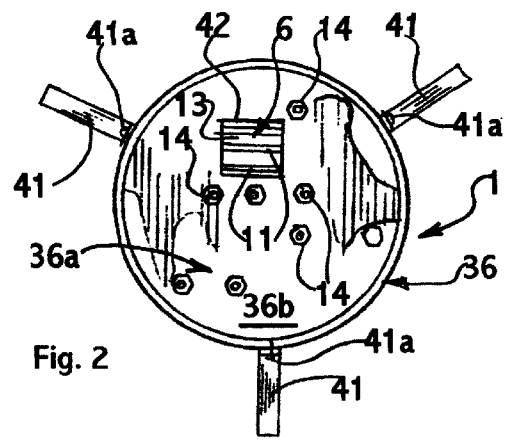
FIG. 2 is a top view of the feed hopper with the lid removed, illustrating an opening in the bottom of the feed hopper for dispensing particulate feed located in the feed hopper to a feeder wheel positioned beneath the feed hopper.
Figure 3:
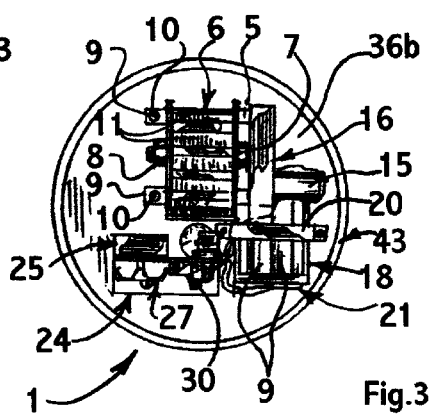
FIG. 3 is a bottom view of the feed hopper illustrated in FIGS. 1 and 2, more particularly illustrating a preferred feeding mechanism for feeding particulate food received from the feed hopper through the hopper feed opening illustrated in FIG. 2.
Figure 4:
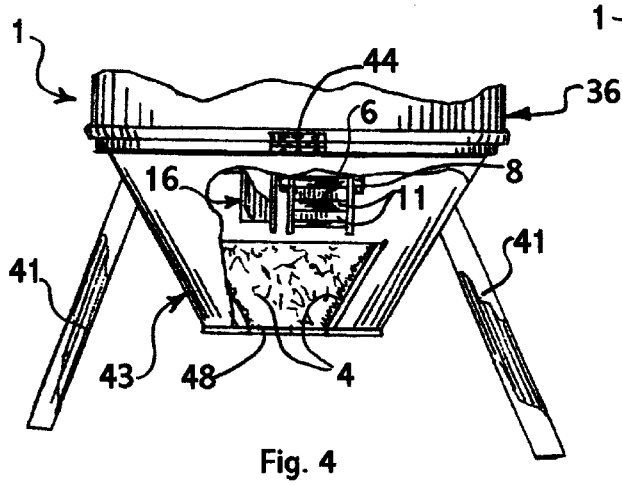
FIG. 4 is a front view, partially in section, of the lower area of the game feeder illustrated in FIG. 1, more particularly illustrating a hopper feed bowl and sound-insulating material provided in the bottom portion of the hopper feed bowl at a feed-discharge opening.
Figure 5:
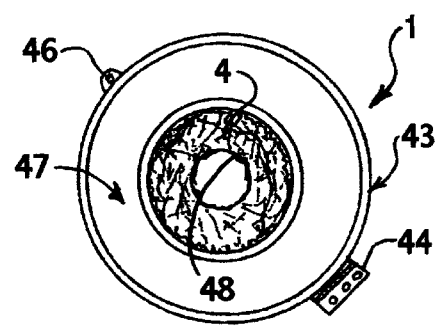
FIG. 5 is a top view of the hopper feed bowl illustrated in FIGS. 1 and 4, more particularly illustrating a preferred location of the sound-insulating material.

Referring initially to FIGS. 1 through 5 and 9 of the drawings in a preferred embodiment the game feeder this invention is generally illustrated by reference numeral 1. The game feeder 1 is characterized by cylindrical feed hopper 36 fitted with a hopper lid 37 and having a handle 38 attached thereto, as illustrated in FIG. 1. The feed hopper 36 is characterized by a hopper interior 36a, which is designed to receive particulate or pelletized food such as corn or the like, for storage. A hopper bottom 36b closes the bottom of the feed hopper 36 and hopper legs 41 may be attached to the feed hopper 36 by means of leg bolts 41a as, desired. A hopper feed bowl 43 is typically attached to the bottom of the feed hopper 36 by means of a bowl hinge 44 and a bowl release 45 that engages a bowl release flange 46, as well as the hopper bottom 36b of the feed hopper 36. Accordingly, the hopper feed bowl 43 can be hingedly opened with respect to the bottom of the feed hopper 36 by removing the bowl release 45 and pivoting the hopper feed bowl 43 on the bowl hinge 44 to expose the feed mechanism located inside the hopper feed bowl 43 and bolted to the hopper bottom 36b. Sound-deadening insulation 4 is provided in the hopper feed bowl 43, around the feed-discharge opening 48, as illustrated in FIG. 5.

Figure 6:
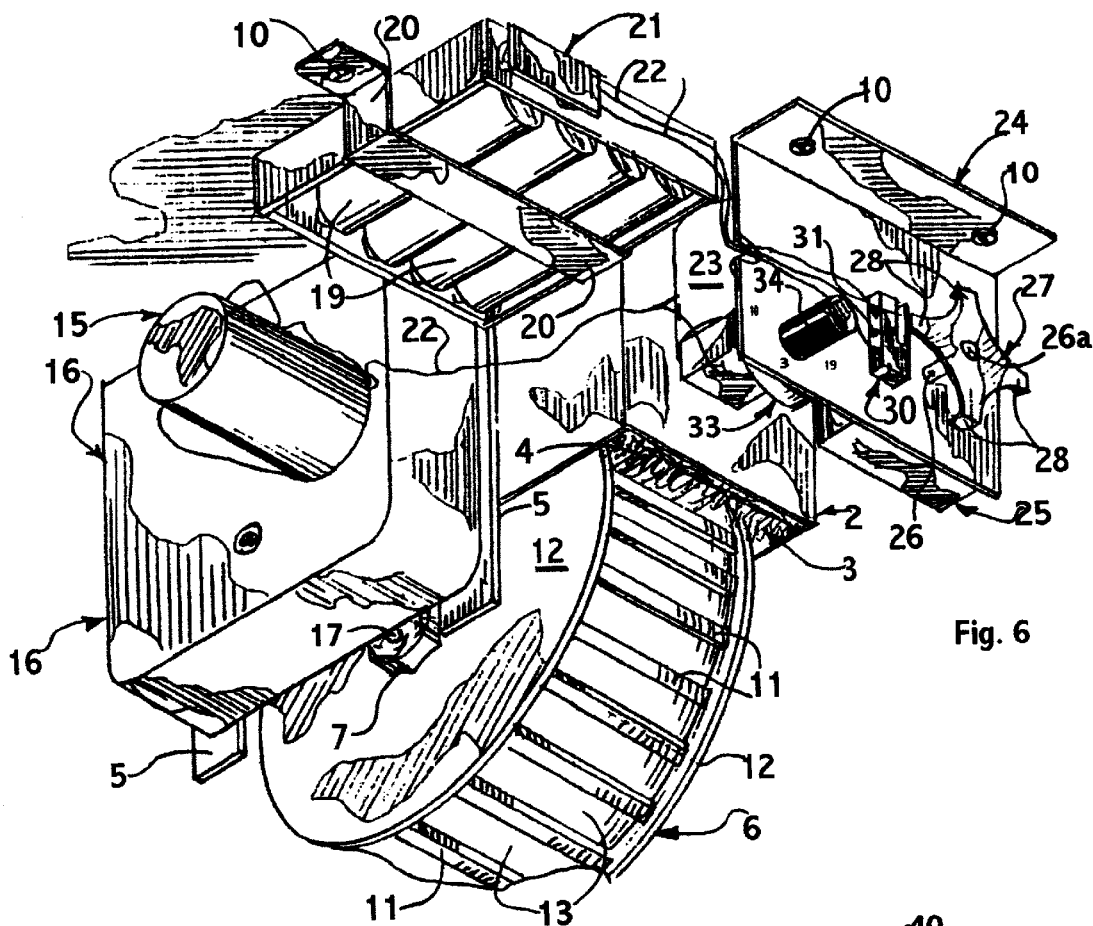
FIG. 6 is a perspective view of a preferred feeding mechanism for mounting on the bottom of the feed hopper illustrated in FIG. 1.
Figure 7:
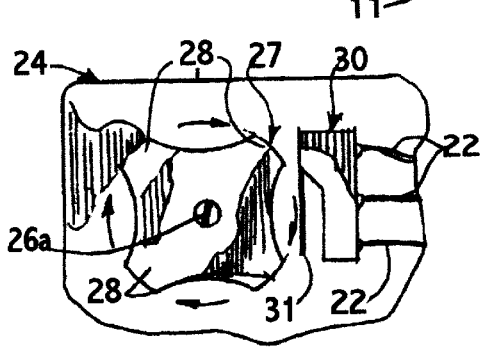
FIG. 7 is a front view, partially in section, of a preferred timing mechanism for orchestrating the feeding of particulate food from the feed hopper into the hopper feed bowl and through the feed-discharge opening.
Figure 7A:
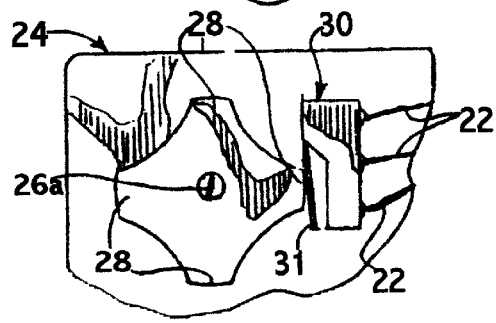
FIG. 7A is a front view of the timing mechanism illustrated in FIG. 7, more particularly illustrating depression of a microswitch arm to activate a feeder wheel and dispense particulate food from the hopper into the hopper feed bowl.
Figure 9:
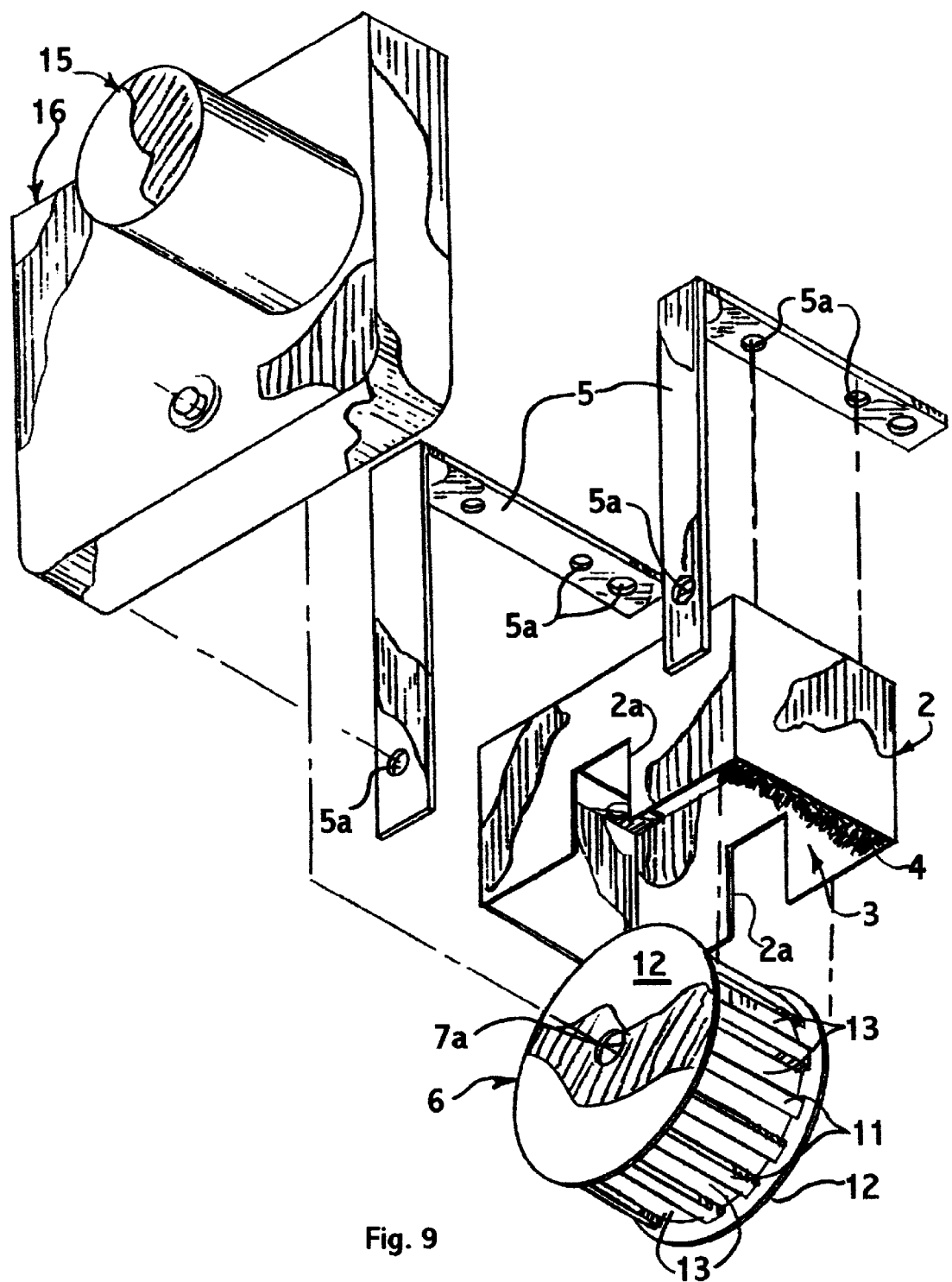
FIG. 9 is an exploded view of the feeder wheel, feeder housing, drive motor and gearbox elements of the game feeder.

Referring now to FIGS. 3, 6 and 9 of the drawings, the feeding mechanism is characterized by a feeder housing 2, mounted on the hopper bottom 36b of the feed hopper 36 by means of mount bolts 10, extending through bracket openings 5a of a pair of L-shaped mount brackets 5 and receiving mount nuts 14. A feeder wheel 6 is rotatably mounted in the housing opening 3 of the feeder housing 2 at the slots 2a by means of a wheel axle bolt 7, secured in place by means of an axle nut 8. The head of the wheel axle bolt 7 receives a gear box shaft 17, extending from a gearbox 16, which mounts a drive motor 15 for rotating the feeder wheel 6, as hereinafter further described. The feeder wheel 6 is further characterized by a wheel drum 13, fitted with a pair of parallel, spaced-apart wheel plates 12 and multiple spacers 11 that are spaced along the periphery of the wheel drum 13, as further illustrated in FIGS. 6 and 9. A battery box 18 contains multiple batteries 19 and a battery bracket 20 secures the batteries 19 in the battery box 18 and bolts to the hopper bottom 36b by means of bracket mount bolts 10 and corresponding mount nuts 14. Battery contacts 21 are attached to a common terminal (not illustrated) connected to the batteries 19 and wiring 22 connects the battery contacts 21 to a microswitch 30, mounted on a timer bracket 24, which is bolted to the hopper bottom 36b by means of additional bracket mount bolts 10 and corresponding mount nuts 14. Additional wiring 22 connects the microswitch 30 and the corresponding potentiometer or rheostat 33 to the drive motor 15 and to a capacitor 23, as further illustrated in FIG. 6. The microswitch 30 is characterized by microswitch arm 31, which lies in the path of multiple indicator arms 28, extending from a timer indicator 27 mounted on a timer shaft 26, which extends through an opening in the timer bracket 24 to a timer 25, mounted on the timer shaft 26. A shaft bolt 26a typically connects the timer indicator 27 to the timer shaft 26. Accordingly, the electrical innerconnection of the batteries 19, the microswitch 30, the rheostat 33, the capacitor 23 and the drive motor 15 and rotation of the timer indictor 27 in the direction of the arrows illustrated in FIG. 7, facilitates operation of the feeder mechanism. When the corresponding indicator arm 28 touches the microswitch arm 31 of the microswitch 30 pursuant to rotation of the timer indicator 27 as illustrated in FIG. 7A, the drive motor 15 is activated and the feeder wheel 6 rotates, thereby dispensing particulate food from the feed hopper 36, as hereinafter further described. A rheostat knob 34 is provided on the rheostat 34 for adjusting the time sequence of operation of the drive motor 15 and the feeder wheel 6.

Referring again to FIGS. 1 through 5 of the drawings, the hopper feed bowl 43 includes sound insulation 4, such as floor carpet, in the area adjacent to the feed-discharge opening 48 and additional sound insulation 4 is provided in the feeder housing 2, at the point where the feeder wheel 6 rotates into the housing opening 3 of the feeder housing 2, as illustrated in FIG. 6. The sound insulation 4 is designed to dampen the noise of corn or other particulate or pelletized feed from the feed hopper 36 as it feeds onto the feeder wheel 6 and from the feeder wheel 6 through the feeder housing 2 against the sound insulation 4 and onto the sound insulation 4 in the hopper feed bowl 43, for dispensing by gravity through the feed-discharge opening 48. The bowl interior 47 is sufficiently large to accommodate the feed mechanism illustrated in FIG. 6 when the hopper feed bowl 43 is positioned in functional configuration on the bowl hinge 44, with the bowl release 45 in place as illustrated in FIGS. 1 and 4.

Figure 8:
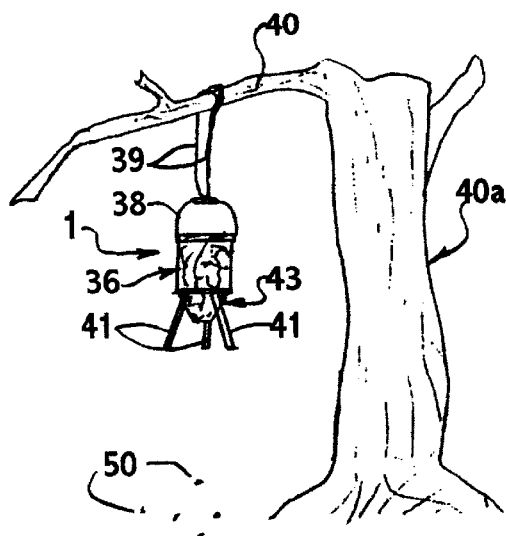
FIG. 8 is a perspective view of a typical suspension of the feed hopper of this invention from the limb of a tree over a feeding area.

In operation, the game feeder 1 of this invention is typically hoisted into a tree 40a and suspended from a tree limb 40 by means of the rope 39, illustrated in FIG. 8. Feed such as corn 50 (FIG. 8) has been previously loaded into the feed hopper 36, by first removing the hopper lid 37 and then replacing the hopper lid 37 on the top of the feed hopper 36, as illustrated in FIG. 1. The hopper legs 41 serve to support the game feeder 1 in the upright position and facilitate easy loading of the corn 50 in the feed hopper 36. Referring again to FIG. 6 of the drawings, batteries 19 are secured in place in the battery box 18 and the battery contacts 21 are positioned as illustrated in FIG. 6 to facilitate power application through the wiring 22 to the microswitch 30, the rheostat 33, the timer 25, the capacitor 23 and the drive motor 15 by means of the wiring 22. The rheostat knob 34 is operated in either the clockwise or the counterclockwise direction to determine a selected duration of power application to the drive motor 15 and dispensing of corn 50 from the feed hopper 36 to the feeding area located beneath the game feeder 1. Pursuant to a constant application of power to the timer 25, the timer indicator 27 is then automatically rotated in the direction of the arrow in FIG. 7 by operation of the timer 25 until one of the indicator arms 28 touches the microswitch arm 31 of the microswitch 30. This action activates the drive motor 15 and effects rotation of the feeder wheel 6 to dispense corn 50 from the feed hopper 36 through the hopper feed opening 42 in the hopper bottom 36b and onto the wheel drum 13, between the respective spacers 11 in the feeder wheel 6. The corn 50 is then quietly dispensed through the feeder housing 2 at the housing opening 3, where the sound insulation 4 mounted in the housing opening 3 serves to deaden the corn-dispensing noise. The corn 50 is then dropped by gravity from the bottom of the feeder housing 2 onto additional sound insulation 4 provided in the bowl interior 47 of the hopper feed bowl 43, where it then further drops by gravity through the feed-discharge opening 48 into the feeding area, as illustrated in FIG. 8. The feeding sequence continues by operation of the drive motor 15 according to a preset time interval determined by the extent of rotation of the rheostat knob 34 in the rheostat 33.

It will be appreciated by those skilled in the art that, very importantly, movement of the corn 50 from the feed hopper 36 through the feeding mechanism onto the ground is very quiet because of the strategic positioning of the sound insulation 4 in the feeder housing 2 and in the bowl interior 47 of the hopper feed bowl 43, as heretofore described. Accordingly, the dropping of the corn 50 on the ground according to predetermined timed sequences simulates the falling of nuts such as acorns and the like from trees and does not alarm animals in the feeding area below the tree 40a. It will be further appreciated that one or more game feeders 1 can be positioned in one or more trees 40a in a given feeding area to dispense a desired quantity of corn 50 or other particulate grain or feed from the feed hopper 36. Furthermore, the rheostat knob 34 can be used to adjust the operational feeding sequence by controlling the time of operation of the feeder wheel 6 to dispense a desired quantity of corn 50 or other grain or food from the feed hopper 36 in a specific feeding cycle.

It will be apparent to those skilled in the art that various circuitry and wiring can be used to control the feeding mechanism of this invention. The circuit must be operable to constantly supply power from the batteries 19 through the wiring 22 to the timer 25, which typically operates as a clock to rotate the timer indicator 27, as described above. The circuit must also operate to charge the capacitor 23 when each indicator arm 28 on the timer indicator 27 contacts the microswitch arm 31 of the microswitch 30, an event which stops the reverse flow of electric current to the batteries 19. The circuit must also include a motor relay (not illustrated), which causes the drive motor 15 to operate and the feeder wheel 6 to turn when the capacitor 23 is charged. The "run" or motor operational time cycle is determined by the adjustment 8 the rheostat 33 by the rheostat knob 34.

While the preferred embodiments of the invention have been described above, it will be recognized and understood that various modifications may be made in the invention and the appended claims are intended to cover modifications which may fall within the spirit and scope of the invention.

Having described my invention with particularity set forth above, what is claimed is:

1. A game feeder for dispensing feed to animals, comprising a feed container having a bottom feed discharge opening; a feed dispenser carried by said feed container above said feed discharge opening for receiving feed from said feed container and distributing the feed through said feed discharge opening; an inanimate drive motor operably engaging said feed dispenser for operating said feed dispenser; and a sound insulator provided in said feed container for quieting the passage of the feed through said feed discharge opening.

2. The game feeder of claim 1 wherein said feed dispenser comprises a feeder housing carried by said feed container and a feeder wheel rotatably disposed on said feeder housing, wherein said drive motor engages said feeder wheel; and comprising a feed bowl substantially enclosing said feeder housing and said feeder wheel and wherein said feed discharge opening extends through said feed bowl and said sound insulator is attached to said feeder housing and surrounds said feed discharge opening in said feed bowl.

3. The game feeder of claim 1 comprising a handle carried by said feed container.

4. The game feeder of claim 1 wherein said feed dispenser comprises a feeder housing carried by said feed container and a feeder wheel rotatably disposed on said feeder housing, wherein said drive motor engages said feeder wheel; and comprising a feed bowl substantially enclosing said feeder housing and said feeder wheel and wherein said feed discharge opening extends through said feed bowl and said sound insulator is attached to said feeder housing and surrounds said feed discharge opening in said feed bowl; and comprising a handle carried by said feed container.

5. The game feeder of claim 1 wherein said feed dispenser comprises a feeder housing disposed in said feed container; a feeder wheel rotatably mounted in said feeder housing, wherein said drive motor operably engages said feeder wheel; and a timer operably connected to said drive motor for operating said drive motor at selected time intervals.

6. The game feeder of claim 5 comprising a feed bowl substantially enclosing said feeder housing, said feeder wheel, said drive motor and said timer, and wherein said feed discharge opening extends through said feed bowl and said sound insulator is attached to said feeder housing and surrounds said feed discharge opening in said feed bowl.

7. The game feeder of claim 5 comprising a handle carried by said feed container.

8. The game feeder of claim 5 comprising a feed bowl substantially enclosing said feeder housing, said feeder wheel, said drive motor and said timer, and wherein said feed discharge opening extends through said feed bowl and said sound insulator is attached to said feeder housing and surrounds said feed discharge opening in said feed bowl; and comprising a handle carried by said feed container.

9. The game feeder of claim 1 comprising a plurality of legs provided on said feed container.

10. The game feeder of claim 9 wherein said feed dispenser comprises a feeder housing carried by said feed container and a feeder wheel rotatably disposed on said feeder housing, wherein said drive motor engages said feeder wheel; and comprising a feed bowl substantially enclosing said feeder housing and said feeder wheel and wherein said feed discharge opening extends through said feed bowl and said sound insulator is attached to said feeder housing and surrounds said feed discharge opening in said feed bowl.

11. The game feeder of claim 9 comprising a handle carried by said feed container.

12. The game feeder of claim 9 wherein said feed dispenser comprises a feeder housing carried by said feed container and a feeder wheel rotatably disposed on said feeder housing, wherein said drive motor engages said feeder wheel; and comprising a feed bowl substantially enclosing said feeder housing and said feeder wheel and wherein said feed discharge opening extends through said feed bowl and said sound insulator is attached to said feeder housing and surrounds said feed discharge opening in said feed bowl; and comprising a handle carried by said feed container.

13. The game feeder of claim 9 wherein said feed dispenser comprises a feeder housing disposed in said feed container; a feeder wheel rotatably mounted in said feeder housing, wherein said drive motor operably engages said feeder wheel; and a timer operably connected to said drive motor for operating said drive motor at selected time intervals.

14. The game feeder of claim 13 comprising a feed bowl substantially enclosing said feeder housing, said feeder wheel, said drive motor and said timer, and wherein said feed discharge opening extends through said feed bowl and said sound insulator is attached to said feeder housing and surrounds said feed discharge opening in said feed bowl.

15. The game feeder of claim 13 comprising a handle carried by said feed container.

16. The game feeder of claim 13 comprising a feed bowl substantially enclosing said feeder housing, said feeder wheel, said drive motor and said timer, and wherein said feed discharge opening extends through said feed bowl and said sound insulator is attached to said feeder housing and surrounds said feed discharge opening in said feed bowl; and comprising a handle carried by said feed container.

17. A game feeder for dispensing feed to animals, comprising a feed container having a bottom feed discharge opening; a feed dispenser carried by said feed container above said feed discharge opening for receiving feed from said feed container and distributing feed through said feed discharge opening, said feed dispenser comprising a feeder housing provided in said feed container, a feeder wheel rotatably mounted in said feeder housing, a drive motor operably engaging said feeder wheel, a timer operably connected to said drive motor for operating said drive motor at selected time intervals and a rheostat provided on said timer for varying the duration of said selected time intervals; and a sound insulator provided in said feed dispenser around said feed discharge opening for quieting the passage of the feed through said feed discharge opening.

18. The game feeder of claim 17 comprising a handle carried by said feed container.

19. The game feeder of claim 17 comprising a feed bowl substantially enclosing said feeder housing, said feeder wheel, said drive motor and said timer, and wherein said feed discharge opening extends through said feed bowl and said sound insulator is attached to said feeder housing and said feed bowl.

20. A game feeder for dispensing animal feed to a feed surface, comprising a feed container having a container interior and a container bottom for supporting the animal feed in said container interior; a feed opening provided in said container bottom; a feeder housing provided on the underside of said container bottom; a feeder wheel rotatably mounted in said feeder housing beneath said feed opening, a drive motor operably engaging said feeder wheel, a timer operably connected to said drive motor for operating said drive motor at selected time intervals and a rheostat provided on said timer for varying the duration of said selected time intervals; a feed bowl substantially enclosing said feeder housing, said feeder wheel, said drive motor and said timer and having a tapered feed discharge opening disposed beneath said feeder wheel, whereby said feeder wheel receives the feed from said feed container and distributes the feed through said feed discharge opening, responsive to operation of said drive motor; sound-deadening insulation provided in said feed bowl around said feed discharge opening for quieting the passage of the feed through said feed discharge opening; a handle carried by said feed container; and a plurality of legs extending from said feed container.

* * * * *